Oct. 1, 1957 W. C. KLEIN 2,807,980
AUTOMATIC PHOTOGRAPHIC PRINTER
Filed April 9, 1956 4 Sheets-Sheet 2
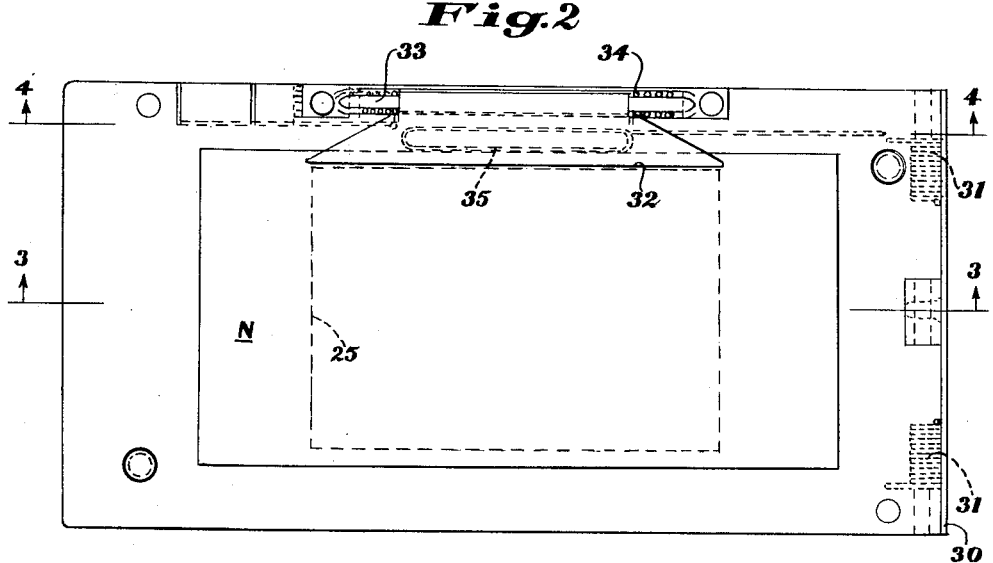
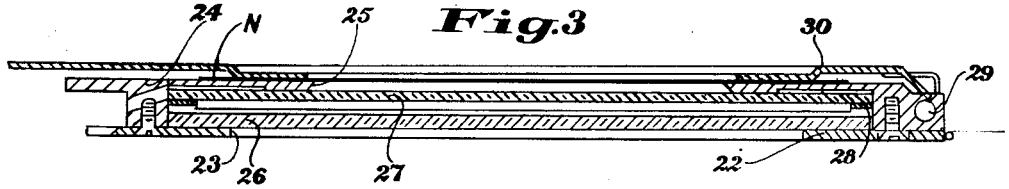
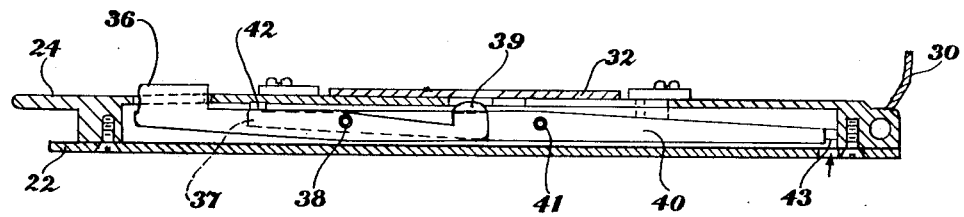
William C. Klein
INVENTOR.

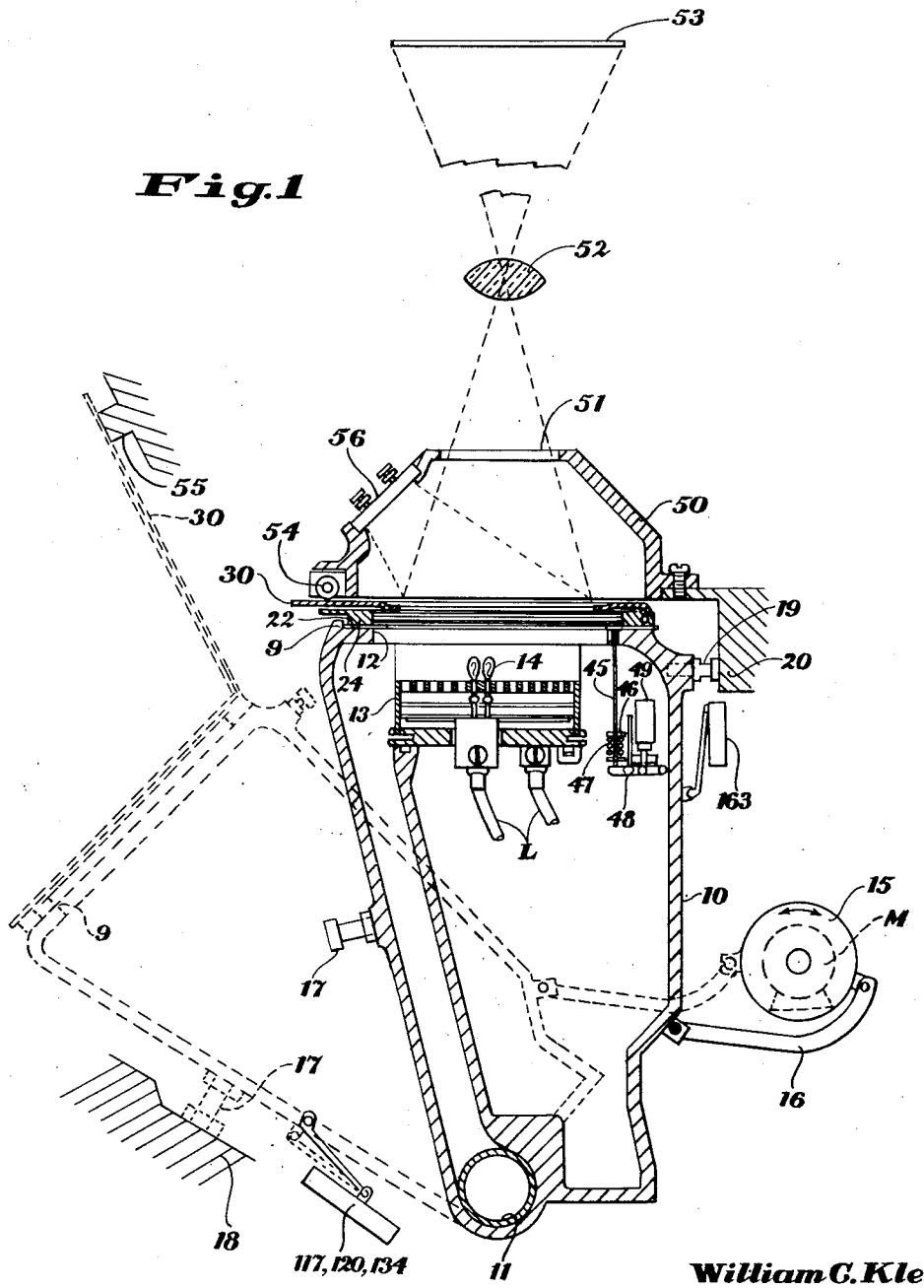

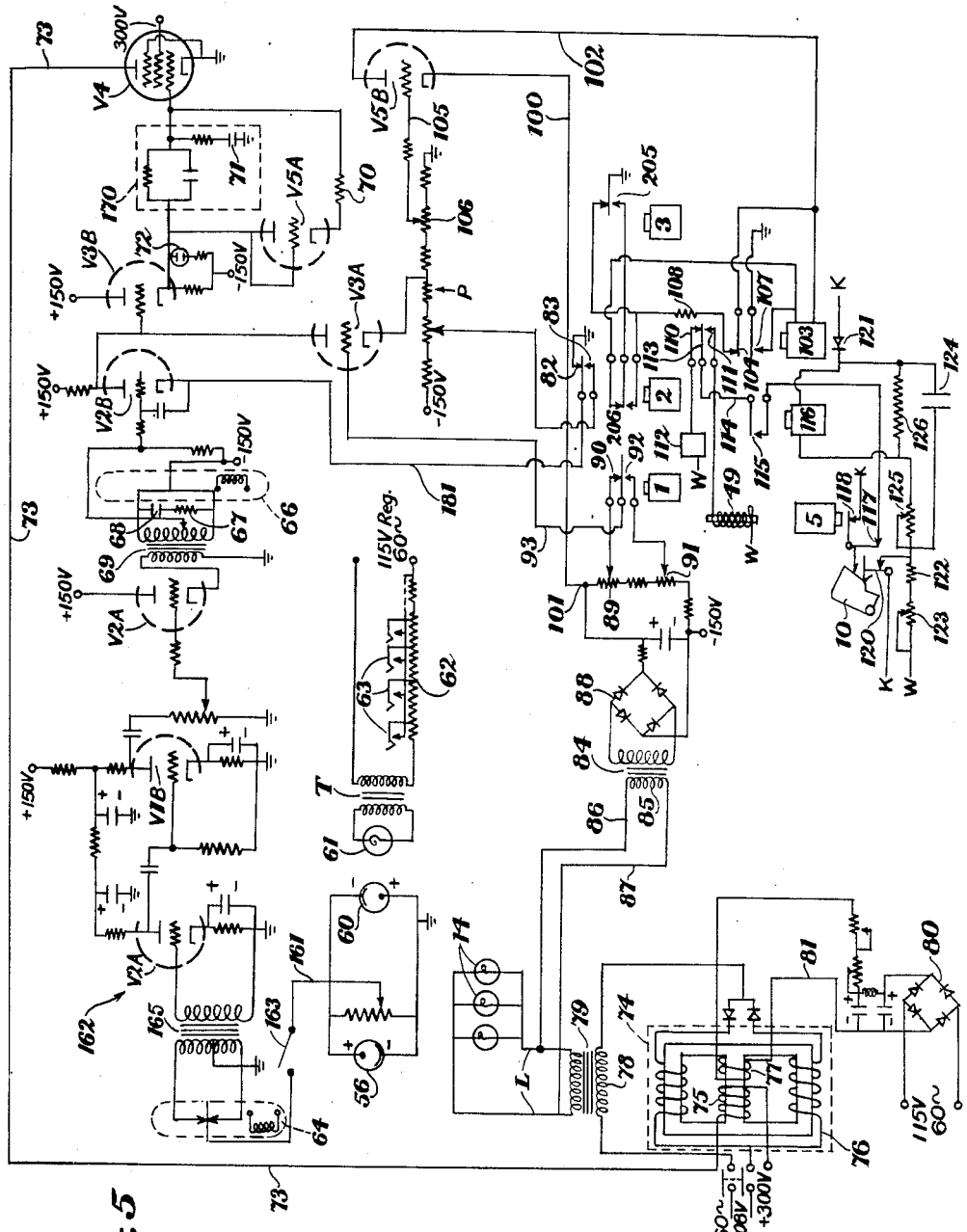

Oct. 1, 1957 W. C. KLEIN 2,807,980
AUTOMATIC PHOTOGRAPHIC PRINTER
Filed April 9, 1956 4 Sheets-Sheet 4

William C. Klein
INVENTOR.
BY
ATTORNEYS

United States Patent Office 2,807,980
Patented Oct. 1, 1957

2,807,980
AUTOMATIC PHOTOGRAPHIC PRINTER

William C. Klein, Rochester, N. Y., assignor to Eastman Kodak Company, Rochester, N. Y., a corporation of New Jersey Application April 9, 1956, Serial No. 576,997

6 Claims. (Cl. 88—24)

The present invention relates to an automatic photographic printer, and particularly to such a printer adapted to warn the operator when any negative printed thereon is not properly exposed.

In automatic photographic printers which include automatic exposure control and automatic paper feeding mechanism all the operator has to do is remove a negative at the end of a printing cycle and replace it with a new one and press a start button. Such printers give very good results until a negative is encountered which for one reason or another, i. e. too dense, etc., cannot be given a proper exposure without going beyond the range of the printer. With known automatic printers the operator has no way of knowing when such an unprintable negative is encountered because the printer goes through its normal cycle even though it may have reached its maximum exposure adjustment which is not great enough to give a satisfactory print from an unusual negative. Such poor prints may then not be detected until many hours later when the completed roll of prints is processed, and then the particular negative must be found and a reprint made on a manual printer or an automatic printer having a greater exposure range. It might be stated that while it is conceivable that any printer could have an exposing range great enough to handle any printable negative, since those negatives which require these extreme ranges of exposures constitute a very small percentage of all negative printed, it would not be practical to slow down the over-all production or complicate the printer in order to accommodate this small percentage of negatives.

The primary object of the present invention is to provide an automatic photographic printer which will automatically signal the operator when a negative is encountered which the printer is not capable of properly exposing.

Another object is to provide a printer of the type described having a gate which includes means for releasably holding the negative thereon and which negative holding means automatically releases the negative when, and only when, the negative has been properly exposed.

And a further object is to provide a printer of the type described wherein the negative gate moves from its printing position to a downwardly inclined viewing and loading position at the end of the printing cycle so that when the negative is released, it falls from the gate due to gravity leaving the gate ready to receive a new negative. If the negative is not properly exposed, then it is not automatically released but must be removed by the operator who can set it aside for reprinting.

And still another object is to provide a printer of the type set forth having an automatic exposure control operating on the constant time-variable intensity principle and wherein the negative holding means is released only when the adjusted intensity of the light transmitted by the negative does not exceed a maximum allowable value.

And another object is to provide a printer of the type described wherein the releasable negative holding means can be operated either manually for loading purposes or by an electromagnet or solenoid for automatic release of the negative at the end of the printing cycle. So that the holding means can be operated manually for loading soon after the automatic release of the previously printed negative, the control circuit for the electro-magnet is so designed that the electro-magnet remains energized only momentarily and just long enough for the negative to fall out of the gate.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings in which:

Fig. 1 is a partial vertical sectional view of a photographic printer constructed in accordance with a preferred embodiment of the present invention;

Fig. 2 is a plan view of a negative gate or carrier used on this printer and with the cover plate raised to a vertical position to show the releasable negative holding means;

Fig. 3 is a longitudinal section taken through the negative gate or carrier substantially on line 3—3 of Fig. 2 but with the cover plate closed;

Fig. 4 is a longitudinal section taken substantially on line 4—4 of Fig. 2 and showing the means for releasing the negative holding means;

Fig. 5 is a wiring diagram showing an automatic exposure control system used on the printer and the connection between the same and the negative releasing means in the printer gate for automatically releasing a negative therefrom only when the negative has been properly exposed.

Figure 6:
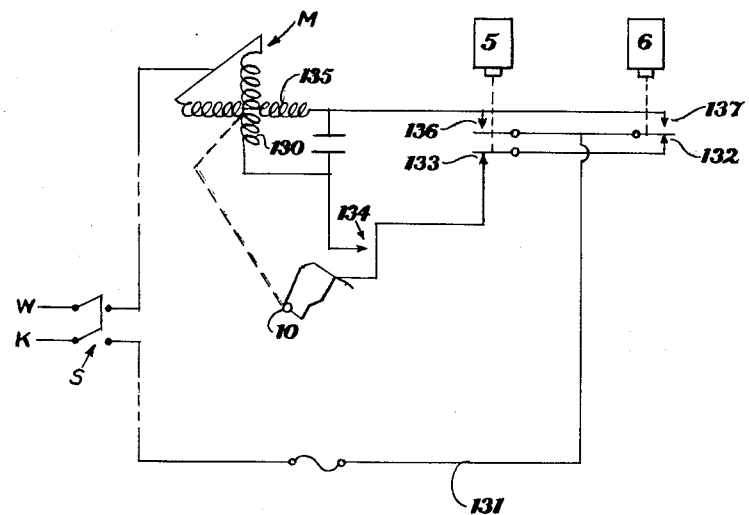
Fig. 6 is a wiring diagram of the negative gate control system.

In its broadest aspects, the present invention relates to a photographic printer having an automatic exposure control system which adjusts the exposure to a preselected value in response to the output of a photo receptor measuring the light transmitted by the negative to be printed. The negative is releasably held in the printer gate and is automatically released at the end of a printing cycle only if the same was properly exposed. If the negative being printed was of such a character that it could not be properly exposed within the range of the exposure control means, the negative is not automatically released from the gate at the end of the printing cycle but must be manually released by the operator before a new neagtive can be inserted. This informs the operator of any negative which is not properly exposed and he then sets it aside for reprinting on a manual printer where the necessary range of exposure can be obtained.

While for purposes of disclose the present invention is described in connection with a black-and-white printer, it is to be understood that the same could just as well be used on a color printer for making color prints from color negatives or color transparencies. Accordingly, throughout this specification while a negative is referred to as the image being printed, it is to be understood that such term is intended to include a positive transparency which is what a color transparency is. Furthermore, while for purposes of disclosing my invention I will show an automatic exposure control system operating on the constant time-variable intensity principle and using a magnetic amplifier lamp control system, it is to be understood that an automatic exposure control system operating on the constant intensity-variable time principle and using any known type of servo system responsive to a photo receptor could be used within the scope of the present invention.

Referring now to Fig. 1, a printer constructed in accordance with a preferred embodiment of the present invention consists of a hollow gate support casting 10 oscillatably mounted on a tube 11 to move between a vertical printing position, shown in solid lines, and a negative viewing and loading position, shown in dotted lines, where its top surface 9 is inclined downwardly. In this position the negative can be conveniently viewed for both judging the subject matter and its alignment relative to the aperture in the gate, and if the negative is not held, it will fall from the gate due to gravity into any suitable receptacle not shown. Supported within the support casting 10 below an opening 12 in the top thereof is a bank 13 of low voltage lamps 14 which extend over the entire area of the opening 12 and which are powered from leads L. This bank of lamps moves with the gate support casting 10 and when the casting is moved to its loading and viewing position, these lamps are automatically dimmed to a comfortable viewing intensity by means described below.

The gate support casting 10 is moved between its two positions by a reversible motor M having a slip drive including a clutch member 15. This clutch member is connected by a curved link 16 to the support casting so that approximately a 180° movement of this clutch in opposite directions serves to move the support casting between its two positions. When the gate support casting reaches its loading and viewing position, as determined by a stop pin 17 on the casting engaging a fixed stop 18 on a fixed part of the printer, the motor M stops and the casting is held in this position by gravity. When the gate support casting reaches its printing position as determined by a stop pin 19 engaging a fixed stop 20, the motor M does not stop, but keeps running throughout the printing cycle and through the slip clutch keeps the stop pin 19 tightly against the stop 20. The control system for the motor M is shown in Fig. 6 and will be described in detail later.

Carried on the top surface of the gate support casting 10 in covering relation with the opening 12 therein is a negative gate or carrier of the type best shown in Figs. 2–4. While this gate could be permanently fixed to the top of the gate support casting, it has been shown as a separate member which can be detachably connected to the support casting in any suitable manner, not shown, so that the printer can be adapted to accommodate different sized negatives by merely replacing one size gate or carrier for another as is well known in the art. This negative gate or carrier comprises a base plate 22 adapted to rest flatwise on the top surface 9 of the support casting 10, see Fig. 1, and having an aperture 23 therein. Fixed to the top of the base plate is an aperture plate 24 on the top of which a negative N to be printed is positioned flatwise. The aperture 25 in plate 24 defines the area of the negative which will be printed. Located between the base plate 22 and the aperture plate 24 is a sheet of heat glass 26 and a sheet of opal glass 27 held in separated relation by a separator spring 28. Hinged to a pintle 29 carried at the rear end of the aperture plate is an apertured cover plate 30 which is adapted to hold a negative flat on the apertured plate 24, and which is normally raised by means of springs 31 wrapped around the pintle and acting on the cover plate.

The apertured plate 24 is provided with a releasable means for holding a negative in place thereon. This means comprises a gripper 32 pivotally mounted on a pintle 33 extending longitudinally of one edge of the apertured plate and acted on by springs 34 which press one edge thereof toward the apertured plate to hold a negative therebetween adjacent one edge of the aperture 25 in the plate. The underside of this gripper also has a downwardly extending film stop 35 against which the operator positions a negative when loading the gate.

The gripper 32 is capable of being manually raised by pressing downward on the end 36 of a lever 37 pivoted intermediate its ends at 38 whereupon the other end 39 thereof engaging the underside of the gripper is lifted and raises the gripper. So that this gripper can be automatically raised at the end of a printing cycle, another release lever 40 extends parallel to and along side lever 37 and is pivoted at 41 intermediate its ends. One end 42 of this lever 40 is turned over and engages the top of lever 37 while the other end 43 thereof extends to the rear of the gate. Upward pressure on end 43 of lever 40 will cause lever 37 to be pivoted to raise the negative gripper 32 just as though the lever 37 has been released manually by depressing on the end 36 thereof.

An upward thrust is applied to the end 43 of the lever 40 to automatically release the negative by a plunger 45 slidably mounted in a bracket 46 mounted within the gate support casting 10, see Fig. 1, and forced to a retracted position by a spring 47. This plunger 45 is moved upwardly to release the negative when a pivoted lever 48 is pulled upwardly upon energization of an electromagnet or solenoid 49. According to the present invention, energization of this solenoid occurs automatically at the end of each printing cycle and just before the gate reaches its loading position so that the negative may fall from the gate by gravity. As will be later described, the energization of this solenoid is under the control of the automatic exposure control system so that the negative will be automatically released from the gate at the end of a printing cycle only if the negative has been properly exposed.

Disposed above the gate support casting 10 is fixed canopy 50 having an aperture 51 in the top thereof through which the image of the negative is projected by lens 52 onto a sheet of printing material 53 held flat in the printing plane. The edge of the canopy through which the gate moves is provided with one or more rollers 54 which serve to engage and close the cover plate 30 of the gate as it moves into printing position, see Fig. 1. When the gate is moved to its loading position, the cover plate 30 of the gate swings up under the action of springs 31 and is limited in its movement in this direction by a fixed stop 55 forming a part of the printer housing. A light-sensitive cell 56 is mounted in the canopy in such position as to measure the light transmitted by the negative and at the same time not interfere with the image projected to the printing plane. This cell forms a part of the automatic exposure control system of the printer, one form of which will now be described.

For purposes of illustrating the present invention I have shown the printer provided with an automatic exposure control system which operates on the constant time-variable intensity principle, and one using a magnetic amplifier for adjusting the intensity of the printing lamps instead of the conventional servo system using a reversible motor for driving a rheostat in the lamp circuit or a diaphragm or density wedge in the printing beam. Furthermore, for purposes of simplicity this control will be disclosed as it would apply to the making of black-and-white prints rather than color prints in which each complete exposure requires the control of the intensity of three separate color beams in succession. In the disclosed system the intensity of the light transmitted by the negative is measured and compared with a preselected standard value and any difference is used to control an adjustment in lamp intensity until the preselected standard value is matched.

Referring now to Fig. 5, the amount of light transmitted by the negative is monitored by the canopy photocell 56 which is connected in closed loop relation with a preselected standard potential, here shown as a compensating or standard photocell 60 which is illuminated by, and monitors, the intensity of a compensator lamp 61. The intensity of the compensator lamp, and hence the output of the compensating photocell, can be altered by changing the resistances 62 in series with the primary of the compensating lamp transformer T. The resistances 62 are generally inserted into the circuit by the operation of classification keys which operate switches 63 and which keys are selectively operated by the operator after judging the negative. The depression of different classification keys changes the preselected standard against which the printer exposure control balances the intensity of the printing light. Throughout the wiring diagram the power lines for the individual elements have been indicated by lines K and W, K designating the live line and W the return line.

The magnitude and the polarity of the output voltage from the canopy photocell and the compensating cell loop depends on the amount and direction of the difference in the two light levels—one the light level reaching the canopy photocell through the negative and the other the light reaching the compensator photocell from the compensator lamp. The magnitude of the output of the photocell loop may be adjusted by means of a gain control. The output signal from the photocell loop passes over line 161 to a signal amplifier, designated broadly at 162, when switch 163 is closed. This may occur when the gate reaches its printing position and switch 163 may be a normally open one which is positioned to be engaged and closed by the gate casting support 10 when it reaches its printing position, see Fig. 1.

To gain the advantage of A. C. amplification at the low signal levels involved, the direct current input (or error) signal from the photocell loop circuit is chopped by a conventional converter 64 and fed through an input transformer 65 to two stages of conventional A. C. amplification including tubes V1A and V1B which may each constitute one-half of a 12AX7 tube. Following the overall gain control, the signal passes through a transformer-coupled cathode follower tube V2A which may be one-half of a 12AX7 tube. This stage provides a push-pull output whose magnitude is limited by the tube saturation and cut-off. It is necessary to limit the signal at this stage to keep the voltage across the contacts of the second converter 66 to a value consistent with long converter life. The resistor 67 and condenser 68 combination across the secondary of transformer 69 is the load on the cathode follower stage. The signal then passes to the second converter 66 which is identical with the first converter 64 and the two are driven in synchronism from a common supply voltage. The second converter synchronously rectifies the A. C. signal to obtain a D. C. signal which is required for the functioning of the stabilization network indicated generally by box 170 and described below.

The output of the second converter 66 is filtered to reduce the pulses inherent in the chopping action and is then amplified by tube V2B which may also be one-half of a 12AX7 tube. A cathode follower tube V3B (½ 12AX7) provides a low impedance source to drive the stabilization network. This lead-lag network alters the frequency response of the system to permit stable operation with the required gain. Tube V5A (½ 12AT7) and the 1.5 megohm resistor 70 in series with it decreases the charging time of the two microfarad capacitor 71 for a positive signal. Since a positive signal causes an increased printing lamp voltage, the time required for the system to reach balance at a higher lamp intensity is decreased. The neon lamp 72 is used as a convenient indicator of system stability. The lamp, being placed in the circuit before the time lag in the stabilizing network 170, responds to the slightest degree of oscillation. The following stage, tube V4 (6V6), is a beam power amplifier which acts as a high impedance source for the control winding of the magnetic amplifier, described below, which is connected into the plate circuit thereof through lead 73. The system is so phased that a decrease in light on the canopy photocell 56 results in an increase in printing lamp voltage thereby restoring the illumination on the canopy cell to the proper or preselected level as determined by the output of the compensating cell 60.

The magnetic amplifier, indicated generally as box 74, comprises a self-saturating reactor having a control winding 75, a load (or output) winding 76 and a bias winding 77. This magnetic amplifier per se is a commercially available unit and has an A. C. output and the characteristics thereof are such that with zero bias current and zero control current applied thereto the output voltage across the primary 78 of the lamp transformer 79 rises to approximately 160 volts. Current from a bridge rectifier 80 passes over line 81 to the bias winding 77 and biases the magnetic amplifier so that the printing lamp 14 voltage is reduced to about 20 volts with zero control current. Current from tube V4 over line 73 to the control winding 75 then causes the lamp voltage to increase. As mentioned above, the printing lamp bank consists of a large group of special miniature lamps 14 rated at 6.5 volts, 0.6 ampere. The number of lamps in the bank may vary from 54 to 94 depending upon the size of the negative to be printed. The transformer 79 which energizes these lamps under the control of the magnetic amplifier steps the voltage down from 115 to 12 volts.

While the operator views the negative with the gate in its loading position, the printing lamp voltage is maintained at approximately three volts regardless of line voltage variation. This is accomplished by the voltage regulating system which operates in the following manner: During the negative viewing period relays 1, 2, and 3 are de-energized as shown in Fig. 5. These relays may be controlled by a cycling system, i. e. motor-driven cams, moving parts of the printer or the like, which constitutes no part of the present invention so that it has been omitted from the present disclosure so as not to further complicate the same. Relay 2 cuts off tube V2B by grounding its cathode 80 through line 181 and relay contact 82. If it were not for a limiter circuit including tube V3A (½ AX7), and described below, this would cause the input to the cathode follower V3B to go positive and result in excessively high printing lamp voltage. However, as the result of this limiter circuit, the greater the printing lamp voltage, the greater the output of the limiter circuit and the harder the limiter tube V3A will conduct. This circuit action reduces the input voltage to cathode follower V3B which in turn decreases the magnetic amplifier control current delivered from tube V4 and which, in turn, decreases the printing lamp voltage until equilibrium is obtained.

The referred to limiter circuit includes a limiting transformer 84 whose primary 85 is connected by lines 86 and 87 across the secondary of the lamp transformer 79. The limiting transformer steps up the 12 volt input to the primary to approximately 30 volts on the secondary which is then fed through a bridge rectifier 88 to obtain a D. C. voltage which is applied across a potentiometer network. Potentiometer 89 is used for setting the system for viewing and is connected to contact 90 of relay 1. Potentiometer 91 is used to control the maximum voltage which can be applied to the lamp and is connected to contact 92 of relay 1. Operation of relay 1, therefore, controls which of potentiometers 89 or 91 is connected through line 93 to the control grid of the limiter tube V3A.

During the printing time, or when the negative gate is in its printing position, relays 1, 2 and 3 are energized. Through contact 83 of relay 2 the bias of the D. C. amplifier V2B is set so that with zero amplifier input signal the printing lamps will be operating near the center of the required voltage range. In a proportional system such as this it is advantageous to split the error in this manner and thereby minimize the maximum deviation or unbalance. Relay 1 when energized, through its contact 92 closes a voltage regulating circuit to protect the printing lamps from burning out should an extremely dense negative require more than some pre-set value of voltage to restore balance. The value of the maximum printing lamp voltage may be adjusted by means of a "Max" potentiometer 91. The operation of this circuit is similar to that described for the viewing lamp voltage regulating circuit in that as the output of the limiter circuit increases with increased lamp intensity, a point is reached where limiter tube V3A conducts to prevent the grid of cathode follower V3B from going more positive and thus limits the output from tube V4 to the magnetic amplifier.

According to the present invention, I provide means for preventing the negative from being automatically released from the gate if it has not been properly exposed so that the operator will be warned of this condition and can set this negative aside for reprinting. Such a condition of improper exposure of a negative will be indicated with a printer operating on the variable intensity principle of exposure control if the maximum allowable printing lamp voltage is attained during printing without the system coming to balance. Accordingly, I provide a top limit detector means which will prevent the automatic release of the negative from the gate at the end of the printing cycle if the maximum allowable printing lamp voltage is attained during a printing cycle. I also provide a buzzer which will indicate to the operator that the top limit was reached during the printing cycle and that the negative which remains in the gate was not properly exposed.

The top limit detector circuit comprises a top limit detector tube V5B (½ 12AT7) whose cathode is connected by line 100 at point 101 to the output of the limiter circuit, whose plate is connected by line 102 to one side of the top limit detector relay 103 and also to movable contact 104 of relay 103. The control grid of tube V5B is connected by line 105 to a potentiometer 106 of a voltage divider P connected to a negative (−) power supply. This top limit detector circuit operates in the following manner: When the printing lamp voltage is less than the pre-set top limit value as determined by the setting of potentiometer 91, the output of the limiter rectifier bridge 88 is such that the cathode of tube V5B is negative with respect to the adjustable bias on its control grid and the plate current of the tube energizes the top limit detector relay 103 as soon as relay 3 is energized at the beginning of a printing cycle and closes its contact 205. Relay 2 is energized shortly after relay 3 and opens the pull-up circuit for the top limit detector relay 103 including its contact 206. The top limit detector relay 103, however, keeps itself energized through a pair of normally open contacts 107. If the lamp voltage increases to the top limit value, the cathode of tube V5B is driven sufficiently positive with respect to its control grid to cut the tube off, and thus release the top limit detector relay 103. A resistor 108 having an impedance value which simulates that of the coil of the top detector relay 103, is inserted into the plate circuit of the top limit detector tube V5B when the relay is dropped out of the circuit. This is necessary because the cathode current from tube V5B which passes through the limiter voltage divider would alter the voltage at the potentiometers 89 and 91, controlling the "viewing" and "maximum" lamp voltages, respectively, if the load resistance of the top limit detector tube V5B were changed.

A set of contacts 110 and 111 on the top limit detector relay 103 are connected to a warning buzzer 112 and the negative release solenoid 49, respectively, to supply power thereto. These elements are also connected to a return line designated by W. The movable contact 113 of relay 103 is connected by line 114 to a power source so that so long as the top limit detector relay is energized, power will be supplied to the negative release solenoid 49 and the buzzer 112 will be cut off. However, if the top limit detector relay 103 is cut off, as it will be if the maximum allowable voltage is applied to the printing lamps, then contact 113 of relay 103 moves up to energize the buzzer 112 and de-energize the negative release solenoid 49 so that the negative will not be automatically released from the gate.

The automatic negative release circuitry also provides a means for automatically releasing the negative from the negative gate only after the gate has returned to its loading and viewing position. In addition, means are provided whereby the negative holding means is held in a released condition just long enough for a negative to fall from the gate after which it is allowed to return to its holding position to permit the operator to position a new negative in the gate.

To this end, power line 114 is interrupted by a switch 115 of a negative release relay 116 and by a normally open "gate out" switch 117 which is engaged by and closed only when the gate support casting 10, indicated schematically in Fig. 5, is in its loading and viewing position. This circuit also includes a relay 5 whose switch 118 is in series with the others in this circuit. This relay 5 is normally de-energized at the end of a printing cycle and is energized when a start switch, or a classification button, not shown, is pushed to start a new printing cycle. During the printing cycle the negative gate 10 is in the printing position and the gate out switches 117 and 120 are not actuated. During this time negative release relay 116, which is D. C. operated, is operated through rectifier 121 in series with resistors 125, 122 and 123. Condenser 124 and resistors 125 and 126 comprise a filter for the half-wave rectifier. When the printing cycle is completed, the negative gate 10 is driven to the "out" or viewing position by motor M. When the viewing position is reached, a circuit is completed through normally closed contacts on the relay 5, the normally open gate out switch 117 and the switch 115 on the negative release relay 116, and contact 111 of top limit detector relay 103 to energize the negative release solenoid 49.

When the negative release solenoid 49 is energized, the negative is released from the gate and falls into a receptacle. At the time that the negative release solenoid is energized, power is supplied through "gate out" switch 120 to the series resistors 122 and 123. With power supplied at the junction of condenser 124 and resistor 122, the condenser cannot receive any further charge and eventually discharges through the relay and resistors 125 and 126. When the condenser discharges to the point where relay 116 returns to the non-operated condition, power is removed from the negative release solenoid 49 by opening of the normally open switch 115 on relay 116. Thus it can be seen that the length of pulse applied to the negative release solenoid depends upon the drop out time of relay 116. This drop out time is adjustable by changing the values of adjustable resistors 126 and 123. Adjustment is required to accommodate various negative sizes, i. e. a longer pulse is required for the large negative sizes than for the small because of the length of time required for the negative to fall free from the negative gate. When the gate is again driven to its printing position, the negative release relay 116 is again energized. However, at the time that the gate is moving forward relay 5 is energized and the circuit which was made through the normally closed switch 118 thereof is broken. Hence, no further pulse can be delivered to the negative release solenoid 49 until the gate is again driven out. This allows the negative holding gripper 32 to return to its normal operative position and permits the operator to load a new negative in the gate by actuating the manual release 36 for this gripper.

Referring to Fig. 6, the negative gate control circuit will now be described. The negative gate control circuit comprises the circuitry necessary to cause the negative gate to automatically position itself in the viewing and printing positions at the proper time. The relays 5 and 6 are part of the printer cycling system, not shown, but for a purpose of the present invention, it will suffice to say that both of these relays are unenergized when the gate is in the "out" or viewing position or when the printer is idle and the main power switch S is in its "off" position. However, during the time the gate is in its printing position and the main switch S is on, one or both of relays 5 and 6 may be energized. The gate motor M is a condenser start-and-run, reversible type of motor. As mentioned above, the negative gate support casting 10 is coupled to the motor M through a friction clutch 15, and the gate must be continually driven against a stop during the printing cycle to assure precise positioning with respect to the optical system. The gate is held in the viewing or loading position by gravity.

When the main switch S of the printer is first turned on, the reverse winding 130 of the gate motor M is energized (if the gate is not already in its "out" or viewing position) through line 131, a normally closed contact 132 on relay 6, a normally closed contact 133 on relay 5 and the normally closed switch 134 which is adapted to be engaged by and opened by the gate support casting 10 when it reaches its viewing or "out" position. The gate motor will continue to run in its reverse direction until the gate reaches its viewing position and opens the gate "out" switch 134 as shown.

During the normal printing cycle the forward winding 135 of the motor is energized whenever relay 5 and/or relay 6 are energized. The circuit to the forward winding is made from line 131 and one of the normally open contacts 136 and 137 on either relay 5 and 6, respectively. When these relays both return to the non-operated condition at the end of a printing cycle, the reverse winding 130 is again energized through the normally closed contacts 133 and 132 on relays 5 and 6, respectively.

While I have shown and described the present invention as applied to a black-and-white photographic printer using a particular form of automatic exposure control system, it is pointed out that it could just as well be applied to a color printer using this same type of automatic exposure control or any photographic printer using other known automatic exposure control systems. For example, the present invention could be used on the automatic color printer shown in U. S. Patent 2,521,954, C. M. Tuttle et al., September 12, 1950. In this printer the exposure of each negative consists of three separate color exposures (red, green and blue) each of which is automatically adjusted to a preselected value by a motor-driven servo system in accordance with a deviation in the intensity of the negative transmitted beam from a preselected standard as determined by a photocell monitoring system. In this system the printing intensity is controlled by a reversible member, i. e. rheostat in the lamp circuit, diaphragm or density wedge in the printing beam, etc., driven by a servomotor, and the top limit detector for paralyzing the negative release in accordance with the present invention could be a switch operated by the reversible member when it reaches a point of maximum adjustment during a printing cycle.

While I have shown and described certain specific embodiments of my invention, I am aware that many modifications thereof are possible. My invention, therefore, is not to be limited to the specific structural details shown and described, but is intended to cover all modifications coming within the scope of the appended claims.

Having thus described my invention, what I claim as new and desire to secure by Letters Patent of the United States is:

1. A photographic printer comprising a variable printing light source; a negative gate for positioning a negative to be printed over said light source; a projection lens for projecting an image of the illuminated negative onto a printing plane; means for automatically varying the intensity of the light source to control the exposure of the negative and including a photoelectric cell positioned to measure the light transmitted by said negative and means controlled by the output of said cell for adjusting the intensity of the printing light until the intensity of the light transmitted by the negative reaches a preselected value; and means for warning the operator when the intensity of the printing light exceeds a maximum allowable value during a printing cycle indicating that the negative in the gate has not been properly exposed.

2. A photographic printer comprising a printing light source; a negative gate for positioning a negative to be printed over said light source; a projection lens for projecting an image of the illuminated negative onto a printing plane; means for automatically varying the intensity of the light transmitted by said negative to control the exposure of the negative and including a photocell positioned to measure the light transmitted by said negative and means controlled by the output of said cell for adjusting the intensity of the light transmitted by the negative until it reaches a preselected value; means for releasably holding a negative in said gate; means for automatically releasing said negative holding means at the end of a printing cycle; and means for rendering said last-mentioned means inoperative in the event a maximum allowable adjustment of the intensity of the negative transmitted light is attained during the printing cycle whereby the negative is not automatically released from the gate and the operator is thereby informed that said negative was not properly exposed.

3. In a photographic printer the combination with a light source, a projection lens, a negative gate movable between a printing position, wherein it positions a negative carried thereby over the light source for illumination thereby, and a loading position, wherein it is inclined downwardly so that a negative carried thereby will slide off the same due to gravity when free to do so, means for moving said gate to its printing position prior to an exposure and for moving it to its loading position at the end of an exposure, an automatic exposure control system for controlling the exposure of a negative in accordance with the amount of light transmitted thereby and including a photocell for measuring said transmitted light, of means for releasably holding a negative in said gate for printing; a manually operable release for said negative holding means to permit loading a negative into said gate; means for automatically releasing said negative holding means at the end of an exposure when the gate reaches its loading position providing the negative was properly exposed as evidenced by the output of said photocell being less than a preselected maximum value; and means for rendering said last-mentioned means inoperative if the negative is not properly exposed as evidenced by the output of said photocell exceeding said preselected maximum value, whereby the operator must manually release said negative from the gate and is thereby warned that it was not properly exposed.

4. A photographic printer according to claim 3 in which the means for automatically releasing said negative holding means comprises a linkage operated by an electro-magnet which is energized at the end of an exposure if the negative was properly exposed and which remains unenergized providing the negative is not properly exposed as evidenced by the output of the photocell exceeding a preselected maximum.

5. A photographic printer according to claim 3 in which the means for automatically releasing said negative holding means comprises a linkage operated by an electro-magnet when energized at the end of an exposure if the negative was properly exposed; and means for automatically de-energizing said electro-magnet shortly after said gate reaches its loading position so that a new negative may be loaded onto said gate by manual manipulation of said negative holding means.

6. A photographic printer according to claim 3 in which the exposure is altered by varying the intensity of the light source, and means for preventing the automatic release of said negative holding means if and when a maximum allowable printing light source voltage is attained during the printing cycle.

No references cited.